Oct. 8, 1940.  J. A. EDEN  2,217,336
MEANS AND PROCESS OF MAKING CONTAINERS
Filed Aug. 14, 1937  6 Sheets-Sheet 1
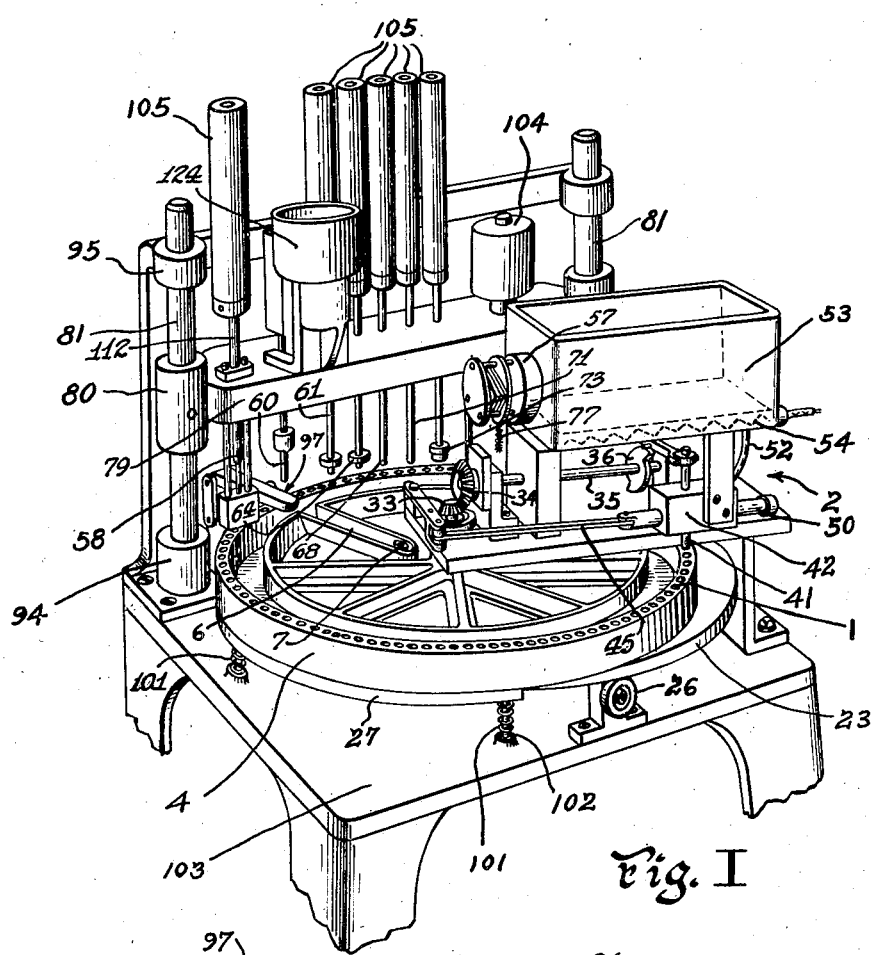
Fig. I
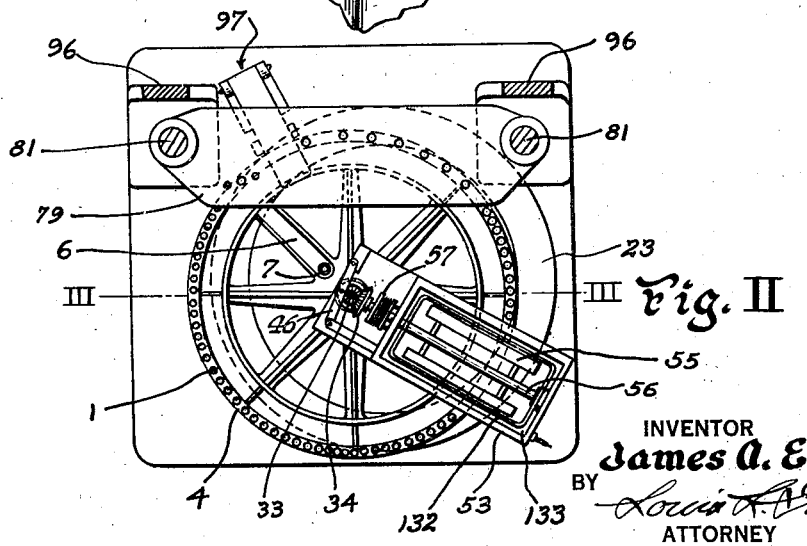
Fig. II
INVENTOR
James A. Eden.
BY
ATTORNEY

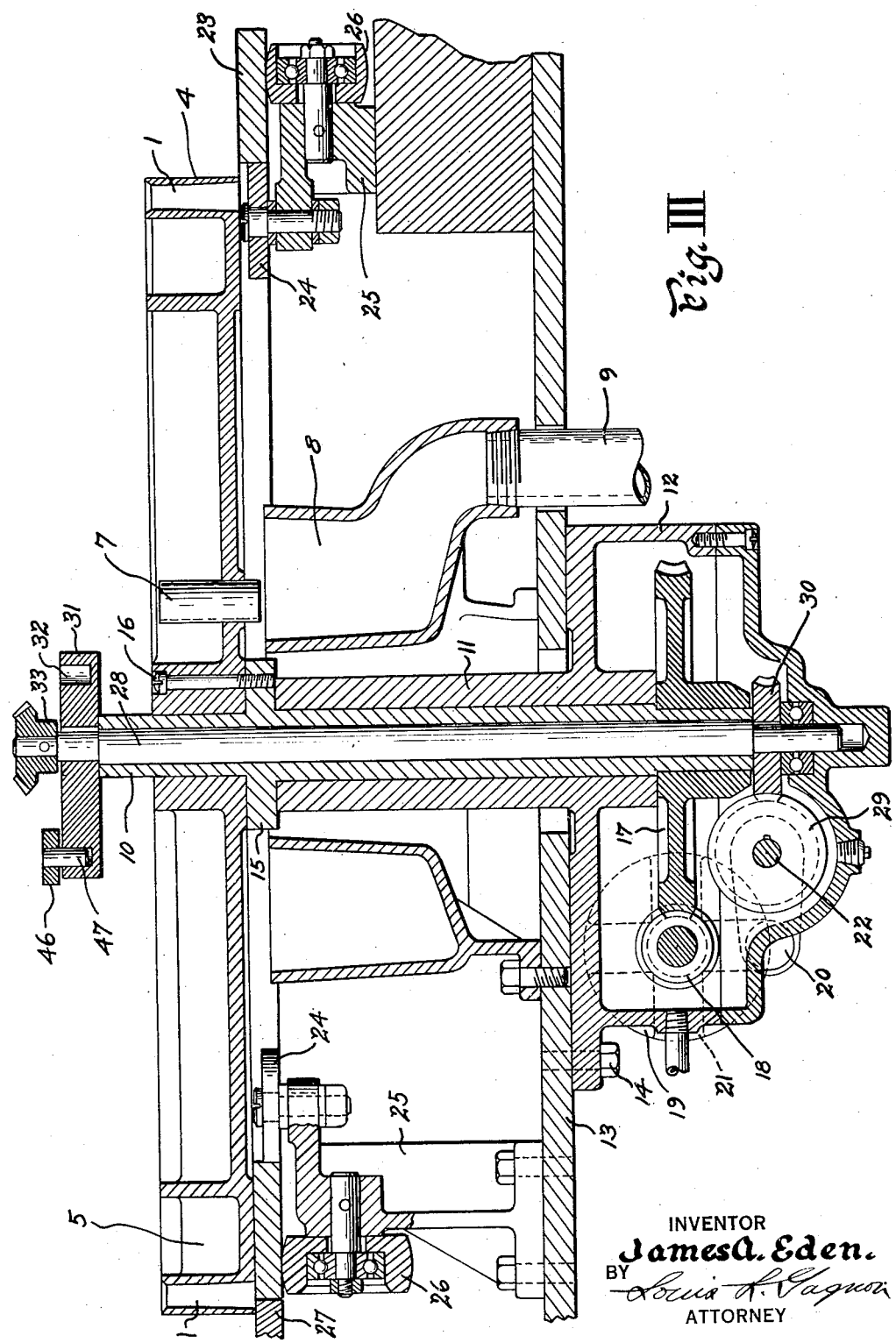

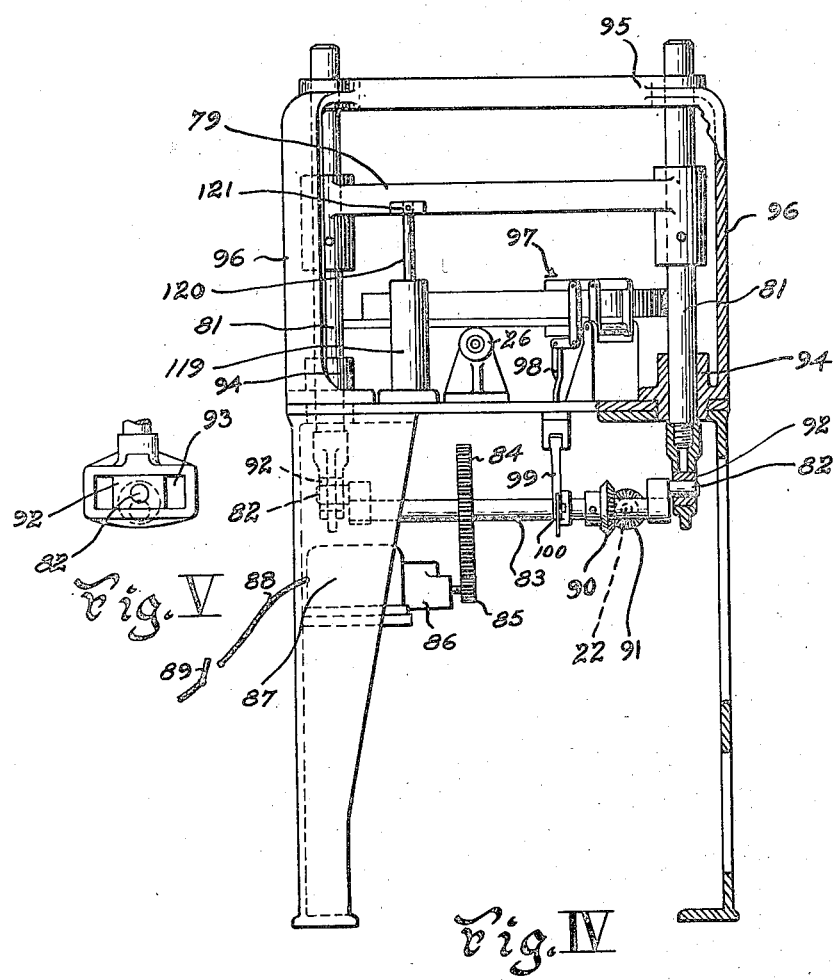

Oct. 8, 1940.         J. A. EDEN         2,217,336
MEANS AND PROCESS OF MAKING CONTAINERS
Filed Aug. 14, 1937          6 Sheets-Sheet 4
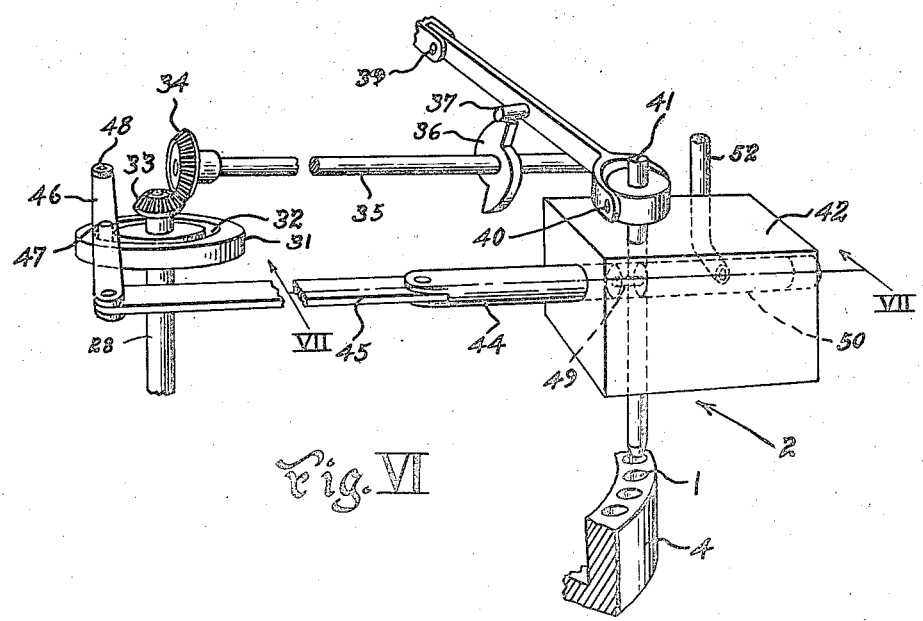
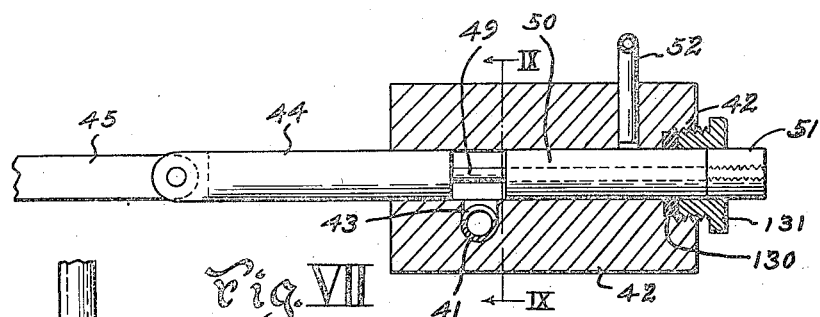
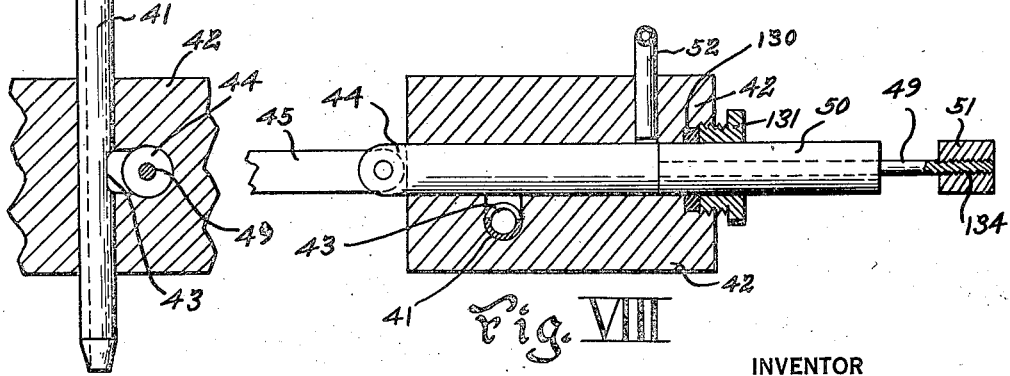
INVENTOR
James A. Eden.
BY
Louis A. Gagnon
ATTORNEY

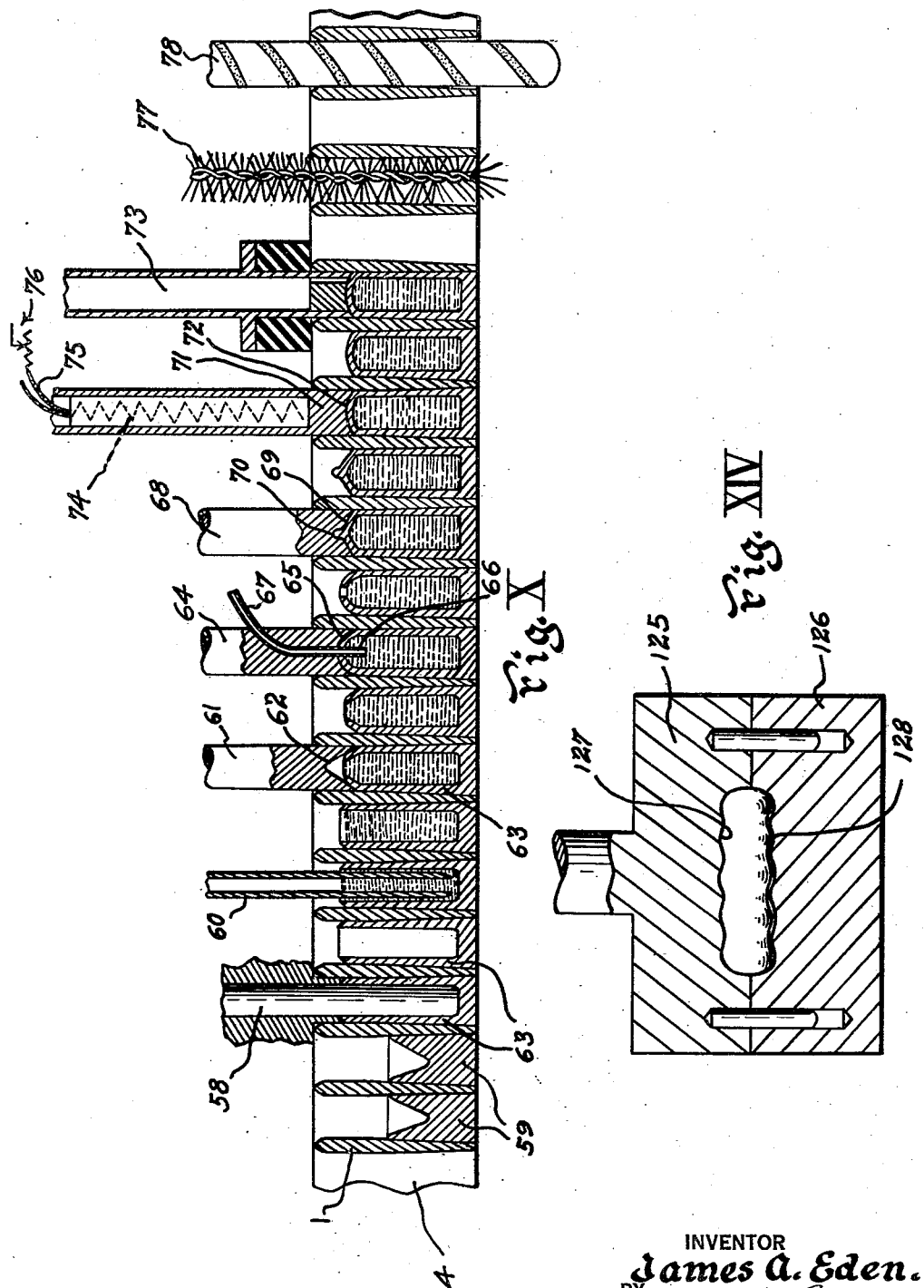

Oct. 8, 1940.  J. A. EDEN  2,217,336
MEANS AND PROCESS OF MAKING CONTAINERS
Filed Aug. 14, 1937    6 Sheets-Sheet 6
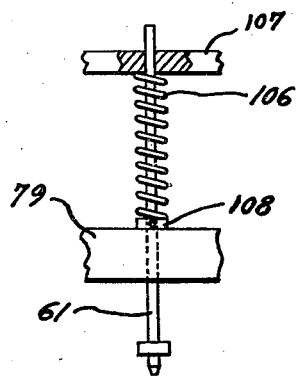
Fig. XI
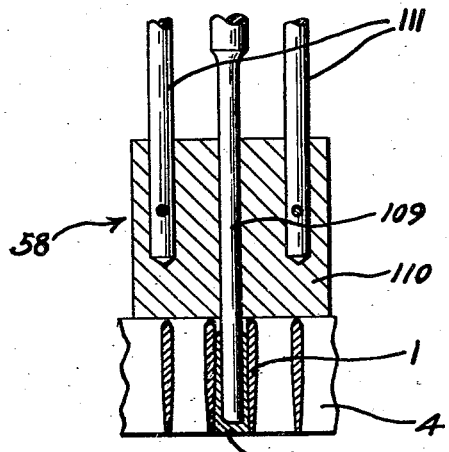
Fig. XII
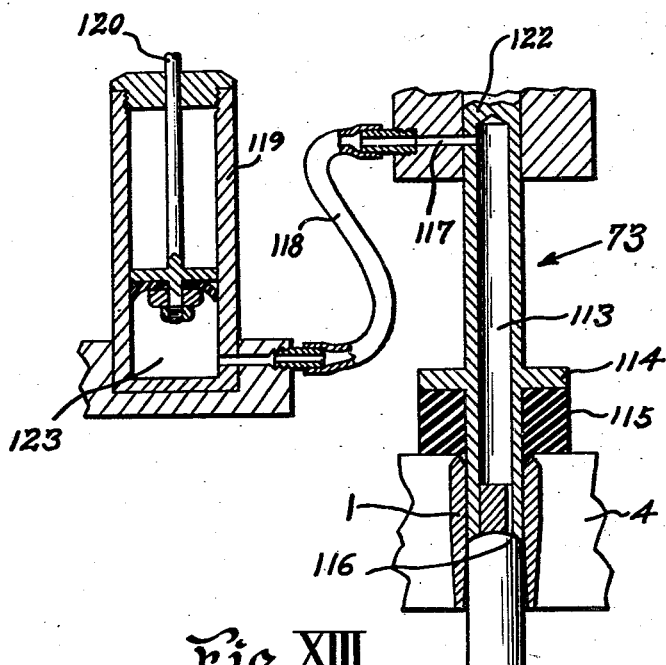
Fig. XIII
INVENTOR
James A. Eden
BY
Louis R. Gagnon
ATTORNEY Patented Oct. 8, 1940

2,217,336

UNITED STATES PATENT OFFICE 2,217,336

MEANS AND PROCESS OF MAKING CONTAINERS

James A. Eden, Springfield, Mass., assignor to Elmer L. Schumacher, Southbridge, Mass.

Application August 14, 1937, Serial No. 159,184

8 Claims. (Cl. 18—5)

This invention relates to novel means and process of making containers including the filling and closing of said containers to seal the fillings therein.

One of the principal objects of the invention is to provide novel means and process of forming a container to a given size in combination with means for performing further steps of the process including filling and closing said containers to seal the fillings therein while continually supporting said containers.

Another object is to provide novel means and process of forming containers, filling and sealing said containers under the action of heat during said sealing operation.

Another object is to provide automatically functioning means for performing some of the steps of the process of manufacture.

Another object is to provide novel means and process whereby a molten solution of a composition having a paraffin base may be molded or cast into a cup shaped container, a predetermined amount of liquid may be deposed in the cup shaped container and the said container may thereafter be shaped to a given size and closed to seal the liquid therein.

Another object is to provide novel means and process of forming, filling and hermetically sealing a desired filling in containers.

Another object is to provide a device for forming containers which is so constructed as to automatically burnish one end of the container during the following steps of the process of filling and sealing the said container.

Another object is to provide molding tubes in which a predetermined amount of material may be deposited and carried through successive steps while in said tubes, including the steps of shaping the deposited material into a cup shaped member, filling said cup shaped member, closing the walls of the cup shaped member inwardly toward each other and thereafter sealing the end of said cup shaped member to provide a sealed container having the filling therein.

Another object is to provide automatically functioning means for performing the above mentioned steps of the process including the ejecting of the filled container from the said means.

Another object is to provide means whereby a composition having a paraffin base containing inert materials may be melted and maintained to a desired mixture or consistency so that the said composition will flow readily and be capable of being carried through the various steps of the process.

Another object is to provide a container which is of such a nature that it may be broke into by biting and which may be rendered plastic and chewable if desired.

Another object is to provide a container of the above character whose composition is such that it will not readily mix with the filling therein if and when the said container is rendered plastic and pliable.

Other objects and advantages of the invention will become apparent from the following description taken in connection with the accompanying drawings and it will be apparent that many changes may be made in the details of construction, arrangement of parts and steps of the process shown and described without departing from the spirit of the invention as expressed in the accompanying claims. I, therefore, do not wish to be limited to the exact details of construction and steps of the process shown and described as the preferred forms only have been set forth by way of illustration.

The invention as referred to in the above objects is directed broadly to novel means and method of forming, filling and sealing containers and resides primarily in first depositing a predetermined amount of pliable composition containing inert materials and having a paraffin base in molding or casting tubes, hollowing out the pliable composition to form a cup shaped member of substantially the size desired, filling the cup shaped member with a desired filling and then sealing the open end of the cup shaped member by integrally joining the composition at the normally open end thereof to seal the filling therein. The gist of the invention is to provide a container whose walls, when completed, are all integrally joined and during use, will be relatively rigid but free to expand and contract within reasonable limits, and which upon the application of heat of a controlled temperature may be rendered plastic, pliable and workable into an integral mass.

Referring to the drawings:

Fig. I is a perspective view of the device embodying the invention;

Fig. II is a plan view of said device;

Fig. III is an enlarged sectional view taken on line III—III of Fig. II;

Fig. IV is a rear elevation of the device shown in Fig. I;

Fig. V is a fragmentary side view of the crank mechanism for operating the head of the device;

Fig. VI is a fragmentary perspective view showing the measuring and depositing operating mechanism;

Fig. VII is a sectional view taken on line VII—VII of Fig. VI;

Fig. VIII is a view similar to Fig. VII;

Fig. IX is a view taken on line IX—IX of Fig. VII;

Fig. X is an enlarged sectional view taken through the casting or molding tubes of the device and illustrating the various steps of the process;

Fig. XI is a fragmentary view of a modified form of the invention;

Fig. XII is an enlarged fragmentary sectional view of the container forming plunger;

Fig. XIII is an enlarged fragmentary sectional view of the ejecting tool; and

Fig. XIV is a fragmentary sectional view of means for shaping the completed containers to varying contours, etc.

Referring to the drawings, and more particularly to Figs. I, II and X, the process broadly comprises the steps of depositing paraffin in a plurality of casting tubes 1, which are successively advanced into alignment with means 2 for measuring and depositing a predetermined amount of liquid paraffin composition into said tubes. The casting tubes 1, as shown in Figs. I to III inclusive as well as in Fig. X, are supported by a rotating table 4 which is intermittently advanced in successive steps equalling the distance between the respective tubes. The table 4 is provided with a circumferential channel portion 5 in which water is adapted to flow to chill and maintain the tubes at the desired temperature during the operation of the machine. The channel 5, as shown in Fig. II, has outlets 6 communicating with overflow pipes 7 through which the water is adapted to flow into a suitable receptacle 8 to be carried away through a drain 9 (see Fig. III). The table 4 is mounted centrally on a hollow shaft 10 supported in a suitable bearing 11 carried by the housing 12 attached to the base support 13 by suitable bolts or like means 14.

The hollow shaft 10 is provided with a flange 15 which rests upon the upper end of the bearing 11 and provides means to which the table 4 is attached by screws or like means 16. The hollow shaft 10 is intermittently rotated to advance the tubes successively an amount equal to the distance between each respective tube by means of a worm gear 17 which meshes with a worm 18 driven by an intermittently operating cam 19. The cam is operated by a crank member 20 which intermittently engages the cam slots 21 in said cam means 19 during each rotation thereof. The crank 20 is carried by a shaft 22 which is rotated by the driving mechanism of the machine which will be hereinafter described in detail.

The table 4 rests upon a circular plate 23 which is supported to rotate in an eccentric path relative to the axis of the hollow shaft 10 by means of rollers 24 carried by suitable brackets 25 mounted on the base 13 of the machine. The brackets also support a plurality of rollers 26 on which the plate 23 rests at various points throughout the circumference of the plate. These various rollers 24 and 26 allow the plate to move through friction contact with a lower surface of the table 4 and due to its eccentric relation with said table is adapted to have a combined rotary and sliding movement relative to the undersurface of the table.

The plate 23 provides means for closing the lower end of the tubes 1 in the vicinity of the measuring and depositing means 2 and also provides means for supporting the paraffin deposits in said tubes in the vicinity of the means for performing the various operations thereon which carry out the process of forming the said deposited paraffin into cup shaped members, placing the filling in said cup shaped members and closing and sealing the filling in said members to form filled containers.

As the table 4 is rotated to move the tubes containing the filled containers into alignment with a tool for ejecting the said containers from the device, the plate 23 moves out of alignment with said tubes so that the said filled containers may be ejected. This is due to the eccentric rotary relation of the plate 23 with the table 4.

A suitable stationary supporting plate 27 is positioned adjacent the rotary circular plate 23 so that when the tubes 1 are rotated they will move from a position overlying the plate 23 to a position overlying the stationary plate 27.

The hollow shaft 10, in addition to providing means for rotatably supporting the table 4, provides a bearing for a shaft 28 which is rotated by means of a gear 29 carried by the rotary shaft 22 and which meshes with a gear 30 mounted on the shaft 28. The shaft 28 supports, adjacent its upper end, a member 31 having an eccentric cam slot 32 therein and also supports, adjacent said member 31, a bevelled gear 33.

As shown in Figs. I, II and VI, the bevelled gear 33 meshes with a bevelled gear 34 carried by a shaft 35 supported in the base of the measuring and depositing means 2. The shaft 35 rotatably supports a cam 36 which engages a pin member 37 carried by a lever 38 pivoted at 39 to the base of the measuring and depositing means 2 and is adapted to intermittently rock the lever 38 about the pivot 39 during the rotation thereof. The lever 38, adjacent its end opposite the pivot 39, is connected as shown at 40 with a hollow plunger 41 slidably mounted in a block 42 carried by the base of the measuring and depositing means 2. The hollow plunger 41 is supported in alignment with the intermittently advanced casting tubes 1 and is adapted to be reciprocated in the block 42 during the rotation of the cam 36. This reciprocating action is for the purpose of moving an inlet opening 43 formed in the side of the hollow plunger 41 into and out of alignment with a device for measuring a predetermined amount of the liquid paraffin.

The device for measuring the paraffin comprises, as shown in Figs. VI to IX inclusive, a plunger 44 mounted to reciprocate in a direction substantially normal to the axis of the hollow plunger 41. The reciprocating action is brought about through a link 45 connected with a rock lever 46 having a pin 47 riding in the slot 32 in the cam member 31. As the cam member rotates, the eccentricity of the cam slot 32 causes the lever 46 to rock about its pivot connection 48 with the base of the measuring and depositing means. As the lever 46 is rocked through its connection with the cam member 31, the link 45 which is connected to the rock lever adjacent its end opposite the pivot connection 48 causes the plunger 44 to be reciprocated in the block 42. The plunger 44 is provided with a reduced rod-like portion 49 having a plunger section 50 slidably mounted thereon. The plunger section 50 is of the same diameter as the plunger 44 and is held in sliding position on the rod-like portion. The rod-like member 49 is of such a length as compared with the plunger section 50 that there is a predetermined spaced relation between the main plunger 44 and plunger section 50 when the said plunger section is in engagement with the collar 51, as shown in Fig. VII. This spaced relation provides a gap in which the liquid paraffin is adapted to flow from a suitable lead pipe 52 connected with the paraffin tank 53.

The reciprocating plunger and the plunger section 50 constitute the paraffin measuring means and operates in the following manner: When the plunger 44 is in the position shown in Fig. VI, the liquid paraffin contained in the gap between the main plunger portion 44 and plunger section 50 is aligned with the inlet opening 43 in the hollow plunger 41 so that the liquid paraffin will flow out of the gap downwardly of the hollow plunger 41 and into the casting tube 1 in alignment with said hollow plunger. To bring about this result the plunger 41 is lowered under the action of the cam 36 to a position wherein its lower end is adjacent the bottom of the aligned casting tube 1. This movement lowers the inlet opening 43 in the side of said casting tube to a position wherein it is aligned with the gap between the main plunger 44 and plunger section 50. This arrangement causes the paraffin to flow into the casting tubes from the bottom upwardly of said casting tubes and extrudes air from the paraffin as the hollow tube 41 is lifted by the cam 36.

When in this aligned position, movement of the plunger 44 in a direction inwardly of the block 42, will tend to close the gap between said main plunger portion 44 and plunger section 50. This is due to the fact that the plunger section 50 is frictionally held against movement throughout its peripheral engagement with the opening in the block 42. The friction is produced by variable friction means 130 such as a leather ring or other suitable material. The friction is varied by tightening or loosening the nut-like means 131 to compress or release the ring. See Figs. VII and VIII. This closing in of the gap between the portion 44 and portion 50 forces the liquid paraffin outwardly of the gap into the hollow tube 41.

Continued movement causes the gap to completely close in, whereby the plunger section 50 will be engaged by the main plunger portion 44 and will be moved to a position illustrated in Fig. VIII. This position is at the extreme inward throw of the cam member 31 so that continued movement of the cam member 31 will cause the cam slot 32 to move the main plunger portion 44 in the opposite or outward direction of the block 42. Again the frictional engagement of the plunger section 50 within the opening in the block causes it to remain stationary until the collar 51 engages the outer end of the plunger section 50.

This arrangement causes the gap between the main plunger portion and plunger section 50 to open when in a position in alignment with the lead pipe 52 coming from the paraffin tank 53. This opening of a gap causes a suction which draws an amount of the paraffin mixture from the tank 53 only sufficient to fill said gap. Continued movement of the plunger section 44 outwardly of the block 42 causes the plunger section 50, through its engagement with the collar 51, to be moved inwardly of the block 42 to the position shown in Fig. VII. This causes the gap which is filled with a measured amount of the paraffin mixture to be moved into alignment with the hollow plunger 41. Simultaneous to this movement the plunger 41 is lowered to a position wherein the inlet opening 43 is aligned with said paraffin filled gap. The gap may be varied in size to change the measured amount of paraffin by adjusting the collar 51 relative to the threaded end 134 of the rod 49.

The measuring device is so constructed that no air will enter and form air bubbles in the paraffin during the measuring operation.

This air sealed construction also applies to the medicament, etc., measuring means which will be described hereinafter.

When in the position illustrated in Fig. VII, the solid wall of the plunger section 50 closes the end of the pipe 52 and thereby checks the flow of the liquid paraffin. This operation is successively brought about during the operation of the machine so that when the casting tubes are successively moved into alignment with the hollow plunger 41, the measuring mechanism moves back to an aligned position with the pipe 52, the gap is formed between the main plunger 44 and plunger section 50 and is filled. The main plunger 44 and section 50 are then moved forwardly to align the filled gap with the plunger 41. Simultaneous to this movement the plunger 41 is moved downwardly into the casting tubes. This takes place during the dwell period of the table 4.

It will be seen that movement of the hollow plunger upwardly, as illustrated in Fig. IX, causes the inlet opening 43 to move over a solid portion of the block 42 internally thereof so that the flow of paraffin outwardly of the tube 41 is checked until the said inlet opening is moved downwardly into alignment with the measuring mechanism. This raises the plunger 41 out of the casting tube and allows the next tube to be advanced by rotation of the table.

The paraffin tank 53, as shown in Figs. I and II, is provided with a heating unit 54 which is adapted to melt the paraffin and to maintain it in liquid form. The tank 53 is provided internally with a container 132 having rotary agitators 55 mounted therein on a shaft 56 and rotated by suitable motor means 57. The space 133 between the main tank 53 and container 132 is filled with water which is heated by the unit 54. The water heats the container 132 and maintains the paraffin mixture at the desired temperature. The temperature is thermostatically controlled so that the paraffin will always flow freely. The thermostat automatically turns on or shuts off the heat when the temperature of the water goes below or above a desired temperature. If too hot the paraffin will burn, if too cold the right amount of paraffin mixture will not be deposited in the tubes 1.

The detail characteristics and function of many of the parts of the mechanism of the present device is more fully disclosed in my copending application Serial No. 69,533, filed May 18, 1936.

It is to be understood that the operating mechanism for intermittently rotating the table 4 and for operating the measuring and depositing means is so timed as to bring about the results desired, namely, that of intermittently aligning the casting tubes 1 with the hollow plunger 41 and for operating the means for measuring the liquid paraffin mixture and depositing the same in the tubes 1.

The measuring and depositing means is so located relative to the table 4 that the successively advanced casting tubes 1, in which the liquid paraffin mixture has been deposited, travel a distance sufficient to allow the said paraffin to be chilled and hardened to a plastic state prior to being moved into alignment with the tools for performing the various steps of the process.

These steps, as illustrated in Fig. X, comprise the pressing of a plunger 58 into the paraffin deposit 59 in each of the casting tubes 1. This is brought about by intermittently moving the casting tubes 1 having the deposits 59 therein successively and intermittently into alignment with the plunger 58 and by forcing the plunger downwardly into the aligned casting tube and into the paraffin deposit. As the plunger enters, the paraffin is forced upwardly of the sides of the plunger 58 to form a cup shaped member 63. The cup shaped member thus formed is advanced through the intermittent movement of the table 4 into alignment with the filling tube 60.

This movement aligns the next following casting tube 1 into alignment with the plunger 58 so that simultaneous to the filling of the hollow cup shaped member 63 in alignment with the filling tube 60, the plunger 58 will perform its function of forming the deposit 59 in said aligned casting tube into another cup shaped member 63. The next intermittent movement of the table 4 moves the filled cup shaped member into alignment with a partial closing tool 61 having a hollow cone shaped end 62 which is adapted to be moved inwardly of the casting tube 1 and in engagement with the end of the filled cup shaped member 63 to move the side walls of said cup shaped member towards each other to produce a tapered end.

The tool 61 together with the plunger 58 and filling tube 60 is simultaneously moved to a raised position away from the casting tubes and the said filled cup shaped member with its partially closed end is then moved into alignment with another partial closing tool 64. The tool, in this particular instance, has a hollow cone shaped end with the angle of the cone shaped walls 65 less than the cone shaped end 62 of the previous tool 61.

The end of the tool 64 centrally of the cone shaped end 65 is provided with a hollow projection 66 which is connected with an overflow pipe 67 leading from the tool. The object of this arrangement is to provide means, which when the tool 64 is moved into engagement with the end of the cup shaped member 63, and the said end is forced inwardly by the cone shaped end 65 into engagement with the hollow projection 66, a predetermined amount of the filling in said cup shaped member will be forced outwardly through the overflow pipe 67. The amount of liquid to be forced outwardly of the overflow pipe 67 is controlled by the length of the hollow projection 66. The more liquid displaced by said projection, the more the overflow through the overflow pipe 67.

The purpose of this is to provide means, which when the tool 64 is lifted out of engagement with the filled cup shaped member 63, whereby the level of the filling will be such as to permit said end to be closed by moving it into alignment with the next following tool 68. This tool is provided with a more shallow cone shaped end 69 and with a central recess 70 so that the air internally of the cup shaped member may be forced outwardly of said cup shaped member when the end walls of said cup shaped member are forced into integral relation with each other by said cone shaped end 69.

The container thus formed is next moved into alignment with a finishing tool 71 having a slightly concaved end face 72 which shapes the end of the filled container. The next advancing movement of the table 4 moves the casting tube containing said completed filled container into alignment with an ejecting tool 73. This tool is hollow and is connected with a compressed air pump, as illustrated in Fig. XIII, so that the compressed air will blow the said container outwardly of the casting tube and into a suitable receptacle.

The plunger 58 and tools 61, 64, 68 and 71 are all preferably provided with an internal heating coil 74 connected through the lead wires 75 to a suitable source of electrical energy whereby the said tools may be heated to a predetermined temperature, the temperature being controlled by a suitable rheostat diagrammatically illustrated at 76. It is to be understood that current flow to each of the said tools is regulated by the rheostat so that the temperature of each tool may be controlled separately. Continued movement of the table next moves the casting tube 1 from which the completed filled container has been ejected into alignment with a rotary cleansing brush 77 which is driven by a motor 104 carried by the head of the machine and which moves inwardly and outwardly of the tube during the dwell of the table 4. The casting tube is then moved into alignment with a lubricating tool 78 which is saturated with an oil of a nature which may be taken internally of the body without injury, such as olive oil, medicating oils, etc.

All of the above tools, as shown in Fig. I, are carried by a suitable head 79 which is attached adjacent its ends 80 on vertically extending slide rods 81. The head 79 is adapted to be raised and lowered by crank members 82 connected to a rotating shaft 83. The shaft is rotated by means of a gear 84 which meshes with a gear 85 driven by speed reduction means 86 of a motor 87. The motor is adapted to be connected by the lead wires 88 to any suitable source of electrical energy.

Suitable switch means 89 is provided for controlling the starting and stopping operation of the machine. Also mounted on the shaft 83 is a bevelled gear 90 which meshes with a bevelled gear 91 on the adjacent end of the shaft 22. This intergearing causes rotation of the shaft 22 and thereby operates the crank member 20 which engages the cam 19. The crank members 82, as shown in Fig. V, are each pivotally connected to a slide block 92 mounted in a slideway 93 in the lower ends of the slide rods 81. The rods 81 are reciprocated in spaced bearings 94 and 95 carried by the brackets 96 on each side of the head of the machine.

To aid in maintaining the table 4 in engagement with the plates 23 and 27, there is provided clamp means 97 operated through a link connection 98 to a lever 99 intermittently engaged by cam means 100 carried by the shaft 83 (see Fig. IV).

The plate 27 is also constantly urged into engagement with the undersurface of the table 4 by resilient means 101, the said plate being supported under the action of the resilient means by rods 102 slidably connected in the base 103 of the machine.

It will be noted that the tubes 1, as shown in Fig. X, are tapered slightly so that the bores of the tubes increase in diameter in a direction towards the bottom of the tubes. This arrangement is for allowing the finished filled and sealed containers to be easily ejected by slight air pressure applied to the upper end of the tube containing the completed container.

The head 79, as previously described above, is adapted to be raised and lowered, and is adapted to move the various tools 58, 60, 61, 64, 68, 71, 73, 77, and 78 into and out of the aligned casting tubes 1 during the dwell thereof after they are intermittently advanced by movement of the table 4. The tools 58, 61, 64, 68, 71 and 73 are all slidably supported in the head 79 and are each adapted to be urged into engagement with the work under the action of gravity by means of the weights 105. The sizes of these weights are controlled according to the amount of pressure desired to be applied to the tool.

It is obvious that if desired, suitable compression springs, such as shown at 106 in Fig. XI, may be used if desired. In this instance, the spring arrangement is shown as being applied to the tool 61 and is located between the head 79 and a suitable upper cross member 107 carried by the slide rods 81 of the machine. In order to exert a pressure on the tool shaft 61, a suitable collar 108 is attached to the shaft by a screw, pin, or like means, and is adapted to be engaged and resiliently limited in its movement by said spring 106, that is, when the shaft of the tool 61 is pressed upwardly in the head 79.

The details of construction of the tools 58, and 73, are shown in Figs. XII and XIII.

The tool 58, as shown in Fig. XII, comprises a plunger 109 and a weight pressed stripping block 110. When the head 79 is moved downwardly by the crank members 82, the stripper block 110 first engages with the upper surface of the table 4 and continued downward movement forces the plunger 109 into the paraffin deposit 59 to cause the said paraffin mixture to flow upwardly of the sides of the plunger 109 within the casting or molding tube 1 to form the paraffin mixture into a hollow cup shaped member.

The block is connected by the spaced rods 111 which are slidably supported in the head 79 and moves upwardly of the plunger 109 under the action of the weight 105, which weight is supported by a rod 112 carried by the spaced rods 111. When the head 79 is raised to withdraw the plunger 109, the stripping block 110, into which the plunger is drawn before the block leaves the upper face of the table 4, prevents the cup shaped member adhering to the plunger 109 and thereby prevents its being removed with said plunger from the casting tube.

In Fig. XIII, there is shown a fragmentary sectional view of the tool 73. This tool is provided with a hollow section 113 having a flange 114 forming a backing support for a resilient washer 115. The end of the tool 73 is provided with a plug having a restricted opening 116 on one side thereof. The hollow section 113 communicates with an air passageway 117 leading to a pipe line 118 connected with a suitable pump 119. This pump is supported in a fixed position on the bed of the machine and is provided with a plunger 120 connected adjacent its upper end, as illustrated at 121, with the head 79. As the head is moved upwardly and downwardly, the plunger 120 is likewise operated. The function of the device, therefore, is that when the head 79 moves the tool 73 downwardly towards the table 4, the end of the tool enters the tube 1 and the washer 115 simultaneously engages the upper surface of the table 4 surrounding the upper end of the tube 1 and is compressed under the action of the downward movement of the tool.

When at a predetermined position, the opening 122 aligns with the air passageway 117 and releases the compressed air from the chamber 123 of the pump forcing the air through the restricted opening 116 and thereby forcing the finished filled container outwardly of the casting tube 1. The air is compressed in the chamber 123 during the downward movement of the plunger 120 simultaneous to the downward movement of the tool 73 so that each stroke of the head of the machine causes a repeated function.

The filling tool 60 is connected with a suitable tank 124 and is provided with a pump arrangement similar to that shown and described for measuring and depositing the molten paraffin in the casting tubes 1, the only difference being that in this instance a different liquid or other material is used. In view of the likeness in structure to the measuring and depositing device shown in Figs. VI to IX inclusive, it is believed to be unnecessary to describe it in detail.

The means which is to be used as a filling, such as any desired medicament, mouthwash, etc. is placed in the tank preferably in liquid form and it is intermittently measured and deposited in the cup shaped members after they are formed by the tool 58 and advanced into alignment with the filling tool 60.

It will be noted that, as shown in Fig. VI, the upper end of the completed container is curved and that the lower opposed end is flat. To provide the lower end with a shape similar to the upper end, the said containers may be engaged with a suitable milling tool or the like to shape the said lower end to the same shape as the upper end or to any other shape desired depending upon the shape of the tool.

It is also apparent from the showing in the drawings that the filled containers as ejected by the ejecting tool 73 and, as shown in Fig. XIV, may be placed between suitable molding dies 125 and 126 provided with differently designed molding faces 127 and 128 for changing the contour shape of said completed containers to any shape desired. It is also apparent that the casting tubes 1 may be made to any cross sectional shape desired, as for instance, square, rectangular, etc.

In the device illustrated in Fig. XIV, the completed container is placed in one section, preferably in the section 126, and the other section 125 is moved downwardly in position to change the shape of the container. The molding dies 125 and 126 may be slightly heated, if desired. It is also to be understood that the molding faces 127 and 128 are of such size as to change the shape of the completed containers to the shape desired without changing their general physical dimensions so that the said containers will not be broken open to allow the filling therein to flow outwardly or to in any way injure said containers. It is also to be understood that the molding faces 127 and 128 may be made to any shape desired. One of the faces might be provided with a suitable engraving or trade-mark die if desired for placing an identification mark, name, etc. on said completed containers.

The process, therefore, resulting from the present invention is that of first providing a plurality of casting tubes which may be intermittently advanced substantially a distance equal to the distance between the said casting tubes and arranging the paraffin measuring and depositing means so that a predetermined amount of liquid paraffin will be deposited in each of the intermittently advanced molding tubes. The molding tubes containing the said paraffin deposits are then cooled by the continuous flow of water into the water channel surrounding said tubes to render the said molten paraffin plastic and pliable. The tubes having the paraffin deposits are then intermittently aligned with the tools performing the various steps of the process of forming the cup shaped members, filling said members and closing in and sealing the end of said cup shaped members to complete the containers. It is quite obvious that at each stroke of the machine, a completed device will be ejected from the casting tubes as all of the steps of the process during the continued operation of the machine will be performed simultaneously.

It is apparent that the paraffin may be rendered any color desired by mixture of suitable vegetable dies therewith or any other dies which are noninjurious to the health.

Although the casting tubes have been previously described above as having a tapered bore, it will be noted that the upper portion of the bore has parallel walls of a size to receive the tools performing the various steps of the process. The bore is then tapered outwardly from the lower end of the parallel wall portion so that the finished containers may be easily ejected.

Having described my invention, I claim:

1. A device of the character described comprising a plurality of successively operating tools on a common support for performing different operations, a plurality of spaced similar molding tubes on a common support adapted to be successively aligned with said tools and having inner walls of predetermined shape, means for successively and intermittently aligning said tubes with said tools and means for moving said tools into and out of said tubes when aligned therewith, one of said tools being arranged to deposit a given amount of composition, which at high temperatures may be rendered liquid and at low temperatures will harden, in said tubes, another of said successively operating tools being a rod-like member of smaller diameter than the tube and, when pressed into the deposits, causing a portion thereof to flow upwardly between the tool and tube to form cup shaped members, another of said successively operating tools being relatively long and hollow and allowing a predetermined amount of filling to flow therethrough to fill said cup shaped members, and other of said successively operating tools being shaped to close in and seal the said cup shaped members with the filling therein, one of said closing tools being heated and being adapted to soften and integrally seal the composition adjacent the normally open end of said cup shaped members.

2. In a device of the character described, the combination of a table having a plurality of peripheral openings therein, and support means on which said table rests for closing the lower ends of some of said openings, said table and said support means being in eccentric relation with each other, means for intermittently moving said support means and table in circular paths about substantially parallel axes to cause some of said openings to move into and out of aligned relation with said support means and means for successively depositing a predetermined amount of material in said successively advanced openings at the completion of said intermittent movements.

3. A method comprising depositing a given amount of a composition, which is of such a nature that, at relatively high temperatures it will be relatively liquid and, at low temperatures it will harden, into a tubular shaped mold, allowing the deposited composition to harden to a state of plasticity adjacent the bottom of said tubular shaped mold, pressing a rod-like shaping tool of a smaller diameter than the mold into said deposit to cause a portion of said deposit to flow upwardly between the shaping tool and the mold to form a cup-like member, removing said rod-like shaping tool from said tubular shaped mold and cup-like member, flowing a liquid filling in said cup-like member while supported by said tubular shaped mold and closing in and sealing while in said tubular shaped mold, under the action of heat, the normally open end of said cup shaped member by forcing the composition of the walls of said cup shaped member into integral relation with each other and thereby forming a filled and sealed container and thereafter removing said filled and sealed container from said tubular shaped mold.

4. A method comprising depositing a given amount of composition, which is of such a nature that, at relatively high temperatures, it will be relatively liquid and which, at low temperatures, it will harden, into a hollow mold having inner walls of predetermined shape, allowing said deposited composition to harden to a state of plasticity, pressing a rod-like shaping tool of a smaller diameter than the mold into said deposit to cause a portion thereof to flow upwardly between the tool and inner walls of the mold to form a cup-like member, removing said rod-like shaping tool from said hollow mold and cup-like member, flowing a filling in said cup-like member while supported by said hollow mold, engaging the walls of the normally open end of said cup-like member with a heated tool to force the composition of said cup-like member adjacent said normally open end into integral relation to seal said end while said cup-like member is supported by said hollow mold and thereby forming a filled and sealed container and thereafter removing said filled and sealed container from said mold.

5. A method comprising depositing a given amount of composition, which is of such a nature that, at relatively high temperatures it will be relatively liquid and which, at low temperatures it will harden, into a hollow mold having inner walls of predetermined shape, allowing said deposited composition to harden to a state of plasticity, pressing a rod-like shaping tool of a smaller diameter than the mold into said deposit to cause a portion thereof to flow upwardly between the tool and inner walls of the mold to form a cup-like member, removing said rod-like shaping tool from said mold and cup-like member, flowing a filling in said cup-like member while supported by said hollow mold, engaging the walls of the normally open end of said cup-like member with a sealing tool and simultaneously removing a given amount of the filling during said engaging of said normally open end by said sealing tool to cause the composition of said cup-like member to close in while removing said filling until the material of the walls of said cup-like member joins in integral relation to seal said filling in said cup-like member and thereby forming a filled and sealed container and thereafter removing said filled and sealed container from said hollow mold.

6. In a device of the character described, the combination of a rotatable table having a plurality of peripheral openings therein, rotatable support means beneath said table and on which the table rests for closing the lower ends of some of said openings, said table and support means being related for rotation in eccentric paths about separate effective axes which are substantially in parallel relation with each other, and means for rotating said table and in turn rotating said support means through frictional engagement thereof with said table whereby the openings in said table will move into and out of aligned relation with the support means.

7. In a device of the character described, the combination of a rotatable table having a plurality of peripheral openings therein, rotatable support means beneath said table and on which the table rests for closing the lower ends of some of said openings, said table and support means being related for rotation in eccentric paths about separate effective axes which are substantially in parallel relation with each other, and means for rotating said table and in turn rotating said support means through frictional engagement thereof with said table whereby the openings in said table will move into and out of aligned relation with the support means and means for cooling the portion of said table having the openings therein.

8. In a device of the character described, the combination of a rotatable table having a plurality of peripheral openings therein, rotatable support means beneath said table and on which the table rests for closing the lower ends of some of said openings, said table and support means being related for rotation in eccentric paths about separate effective axes which are substantially in parallel relation with each other, and means for rotating said table and in turn rotating said support means through frictional engagement thereof with said table whereby the openings in said table will move into and out of aligned relation with the support means and a plurality of aligned tools progressively aligned with each other and arranged in cooperative relation with said table for successive alignment of said openings therewith, one of said tools having characteristics whereby a predetermined amount of moldable composition may be deposited successively in said openings and the remainder of said tools having separately functioning characteristics to shape said deposited moldable material into cup shaped members, to deposit a suitable filling in said cup shaped members and to close the normally open end of said cup shaped members to seal the filling therein.

JAMES A. EDEN.